United States Patent Office 3,718,123
Patented Feb. 27, 1973

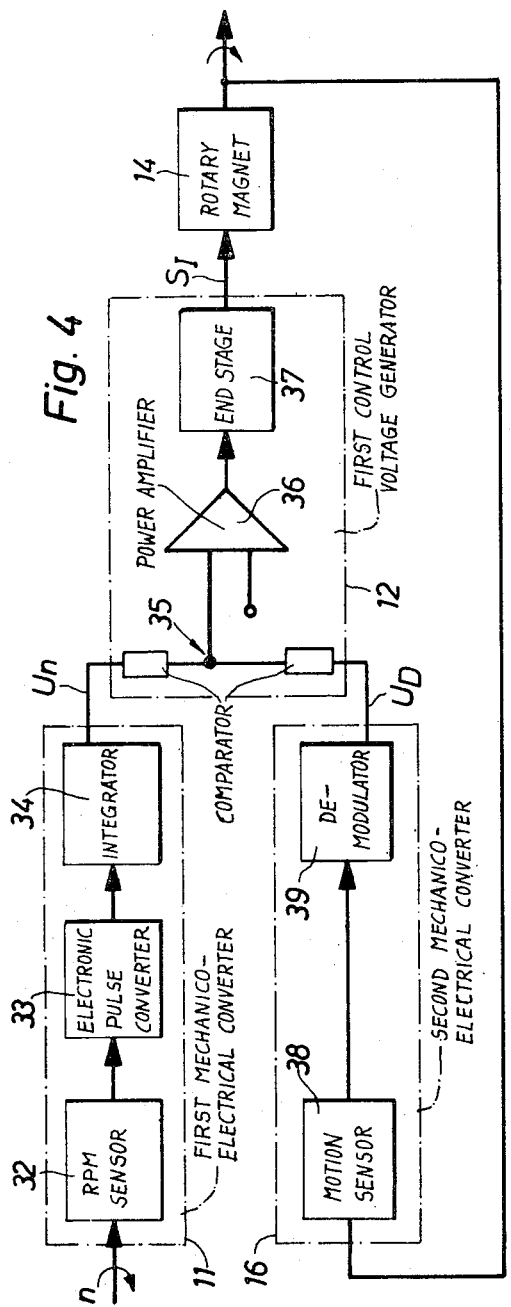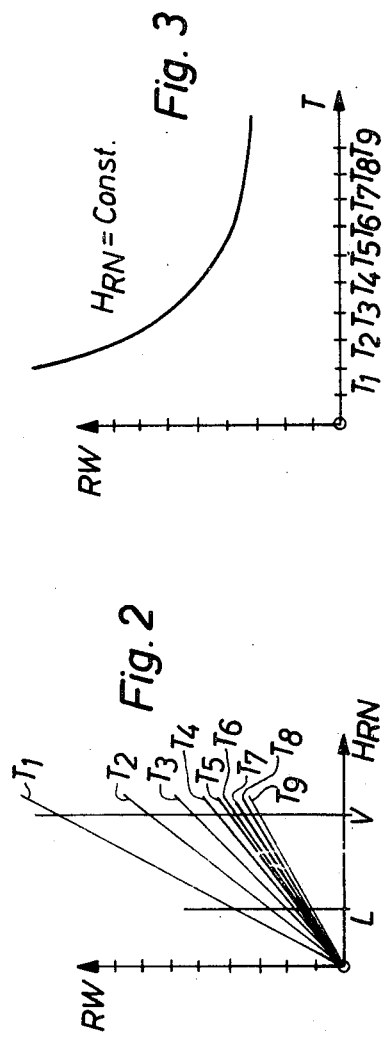

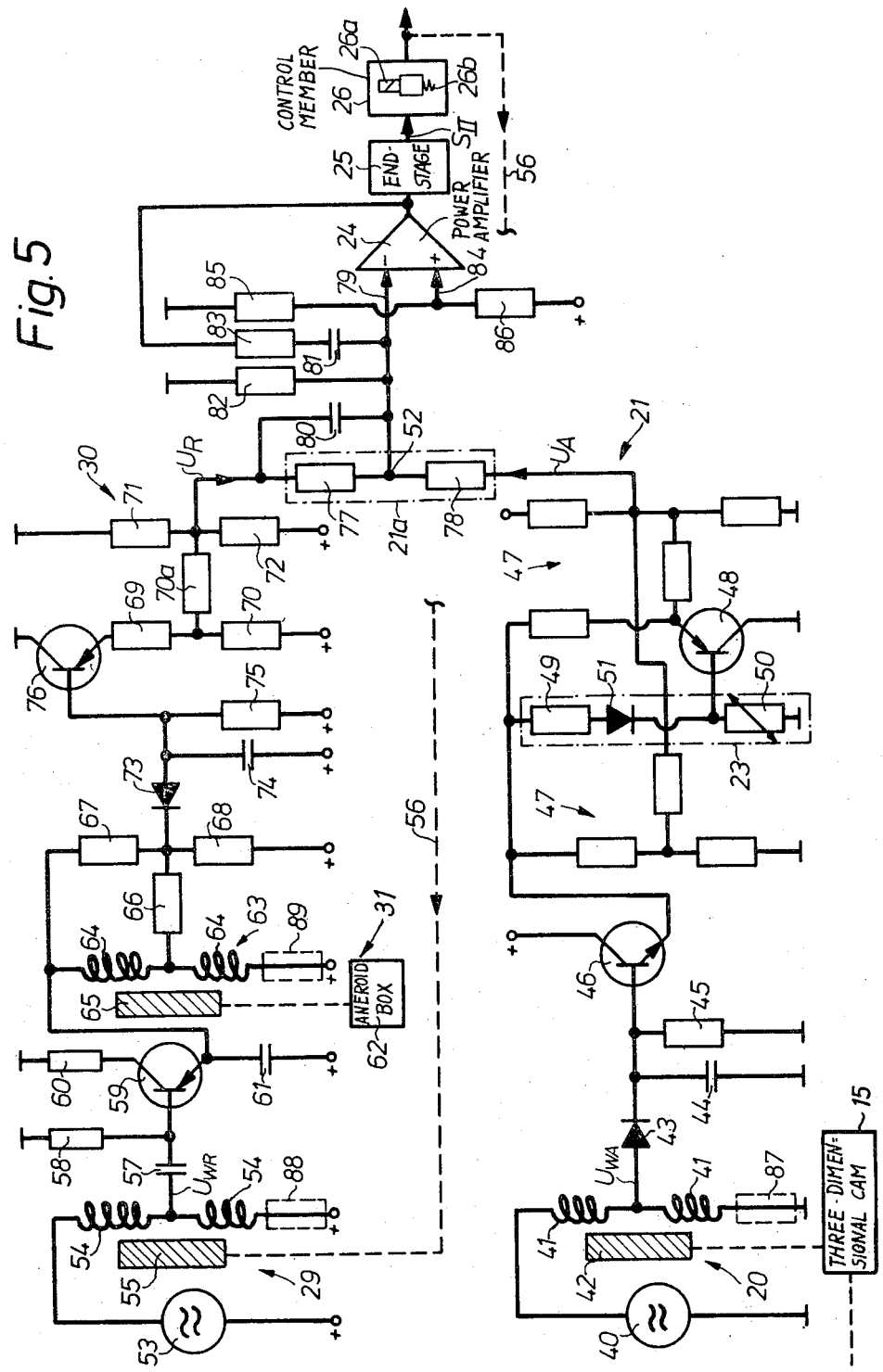

3,718,123
APPARATUS FOR REGULATING THE AIR-FUEL MIXTURE IN AN EXTERNALLY IGNITED INTERNAL COMBUSTION ENGINE OPERATING ON INJECTED FUEL
Konrad Eckert, Stuttgart-Bad Cannstatt, Heinrich Knapp, Leonberg-Silberberg, and Gerhard Engel, Stuttgart, Germany, assignors to Robert Bosch G.m.b.H., Stuttgart, Germany
Filed Nov. 30, 1971, Ser. No. 203,345
Claims priority, application Germany, Dec. 3, 1970, P 20 59 473.4
Int. Cl. F02d 1/04, 1/06; F02b 3/00
U.S. Cl. 123—140 CC      13 Claims

ABSTRACT OF THE DISCLOSURE

The fuel rack of a fuel injection pump is regulated as a function of the engine r.p.m., the position of the arbitrarily operated butterfly valve and other operational variables. For this purpose an electric signal representing a desired value is derived from the angular and axial positions of a three-dimensional cam (which assumes its position in response to an electric signal characterizing the actual engine r.p.m. and in response to a mechanical signal characterizing the actual position of the butterfly valve) and is compared with an electric signal representing an actual value derived from the actual position of the fuel rack. The electric signal resulting from said comparison is applied to a control member which is displaced accordingly and which, by virtue of its connection with the fuel rack, causes a corresponding movement of the latter. Electric correcting signals representing physical magnitudes, such as engine temperature and atmospheric pressure, vary the desired and/or actual value signals prior to their comparison.

BACKGROUND OF THE INVENTION

This invention relates to a regulating apparatus for the air-fuel mixture introduced by means of injection into a spark plug-ignited internal combustion engine, particularly of the type associated with an automotive vehicle. The regulating apparatus is of the type that includes a control member which, as a function of several operational variables of the internal combustion engine, displaces the fuel quantity setting member (hereinafter referred to as "fuel rack") of a fuel injection pump and which further includes an r.p.m. sensor which affects the position—preferably the angular position—of a three-dimensional cam. The relative position of a follower member associated with the three-dimensional cam is changeable as a function of the position of an arbitrarily operable lever connected to the butterfly valve. The regulating apparatus also includes a correcting member which is affected by at least one physical magnitude, preferably the air pressure and/or the temperature. The correcting member adjusts the setting of the fuel rack determined by the position of the three-dimensional cam.

In known regulating apparatuses of the aforenoted type, such as disclosed in German published patent application DOS No. 1,916,733 and in the periodical "Motortechnische Zeitschrift," Issue No. 9, September 1965, pages 353–361, the desired performance curve of the engine may be reproduced by the three-dimensional cam.

Stated differently, to every r.p.m. and every position of the butterfly valve there is assigned a favorable setting of the fuel rack of the fuel injection pump. Said setting is so determined that it takes into account the engine output and the fuel consumption. The correction of the position of the fuel rack as a function of the engine temperature and air pressure (such a correction is indispensable for gasoline injection) is additionally effected by mechanical correcting members.

The spatial requirements of regulating apparatuses of the afore-outlined type are very substantial since practically all components are situated in one bulky group due to the mechanical connecting linkages between components.

In view of the legal requirements concerning the standards of clear air (California test), in modern vehicle engines the performance curve also has to take into account the limit value relating to the proportion of pollutants in the exhaust gases. For this reason, the performance curve has to represent exact values of the air-fuel mixture even at low r.p.m.'s. This requirement necessitates a high resolution or magnification and a higher accuracy of the performance curve to be reproduced by the three-dimensional cam. This necessarily leads to a larger three-dimensional cam which, in turn, requires longer setting paths and greater setting forces. These additional requirements can be met in an imperfect manner by means of an enlarged regulating apparatus, since the effect of the acceleration forces at the engine will become very substantial due to the increased mass of the components. In addition, the requirement for a small structural space in modern vehicle engines does by no means favor an increase in the dimensions of the regulating apparatus.

OBJECT AND SUMMARY OF THE INVENTION

It is an object of the invention to provide an improved regulating apparatus of the aforenoted type which meets the afore-discussed requirements and makes possible a higher resolution of the performance graph of the engine while maintaining the dimensions of the apparatus small and also, eliminates the disadvantages of prior art systems.

Briefly stated, according to the invention, the control member which is connected with a position indicator feedback component, is operable by the control signal delivered by an electronic regulator and there is provided a first mechanicoelectrical converter for converting the r.p.m. of the internal combustion engine into an r.p.m.-dependent voltage which is applied to a first control signal generator of the electronic regulator (see German Pat. No. 1,261,354). The output signal delivered by the first control signal generator drives an electric setting member (electromagnet) for changing the position of the three-dimensional cam.

There is further provided a third mechanicoelectrical converter which generates a voltage dependent upon the position of the follower member associated with the three-dimensional cam. The last-named voltage is applied to a first branch of a second control signal generator of the electronic regulator. The control signal delivered by the second control signal generator sets in such a manner the control member associated with the fuel rack that the latter assumes the position predetermined by the three-dimensional cam when a voltage generated by a fourth mechanicoelectrical converter (serving as a position indicator feedback component mentioned above) and applied to a second branch of the second control signal generator, corresponds to the voltage which is delivered by the third mechanicoelectrical converter.

It is an advantage of the invention that the electrically driven three-dimensional cam may be of small dimensions despite the increased demands on performance, because its follower member may have a small scanning radius due to the small actuating forces.

The invention will be better understood as well as further objects and advantages become more apparent from the ensuing detailed specification of a preferred although exemplary embodiment of the invention taken in conjunction with the drawing.

BRIEF DESCRIPTION OF THE DRAWING

FIGS. 2 and 3 are diagrams illustrating the interrelation between temperature, cam stroke and setting path of the fuel rack;

FIG. 4 is a simplified block diagram of a first part of the regulating apparatus for varying the angular position of the three-dimnsional cam;

FIG. 5 is a detailed circuit diagram of a second part of the regulating apparatus for displacing the fuel rack;

DESCRIPTION OF THE PREFERRED EMBODIMENT

Figure 1:
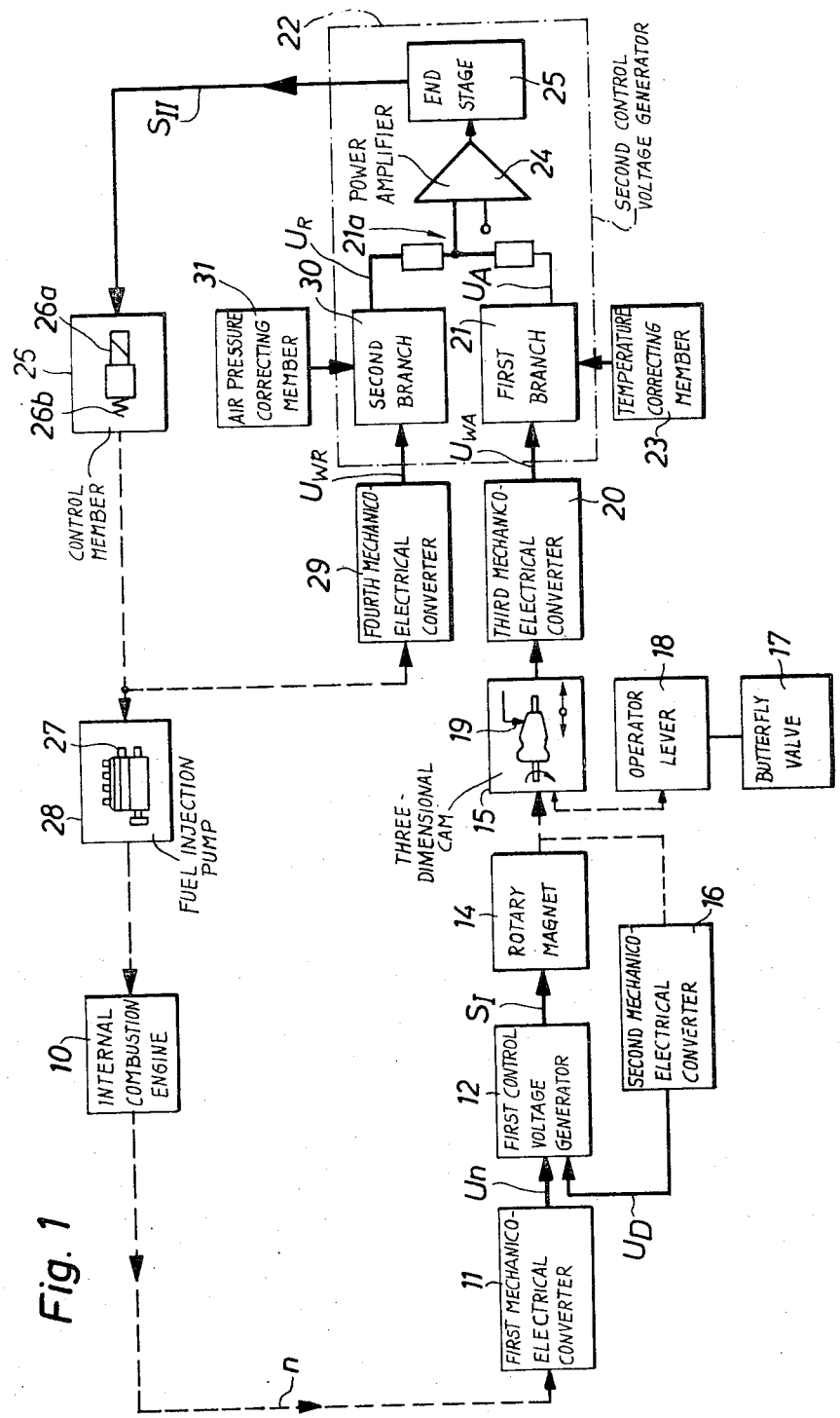
FIG. 1 is a block diagram of the entire regulating circuit.

Turning now to FIG. 1, it is first noted that the mechanical connections between components are shown in broken lines, while the electrical connections are indicated with solid lines.

The block diagram illustrated in FIG. 1 shows a spark plug-ignited internal combustion engine 10, the r.p.m. $n$ of which is converted into an r.p.m.-dependent voltage $U_n$ by a first mechanicoelectrical converter 11. The voltage $U_n$ is applied to a first control voltage generator 12 of an electronic regulator 12, 22, formed substantially of two control voltage generators 12 and 22. It is noted that this electronic regulator is indicated at 13 in FIG. 8. The output signal $S_I$ delivered by the first control voltage generator 12 energizes a rotary magnet 14 functioning as a setting member which turns a three-dimensional cam 15. The angular position of the three-dimensional cam 15 depends upon the r.p.m. $n$ of the engine 10. For ensuring a highly accurate angular positioning of the three-dimensional cam 15, an electric signal $U_D$ characterizing its angular position is fed back to the input of the first control voltage generator 12 through a second mechanicoelectric converter 16 serving as a position indicator feedback member.

In addition, to its displacement as a function of the r.p.m., the three-dimensional cam 15 is also displaced as a function of the position of an operator lever 18 (accelerator pedal) connected to the butterfly valve 17 of the engine 10. For this purpose the three-dimensional cam 15 is axially displaceable and thereby varies its relative position with respect to a follower member 19. It is to be understood that instead of the last-named displacement of the three-dimensional cam 15, it is feasible to cause a displacement of the follower member 19 and it is also feasible to transmit the position of the operator lever 18 to the three-dimensional cam 15 by electrical, rather than mechanical means.

A third mechanicoelectrical converter 20 generates a voltage $U_{WA}$ which depends on the position of the follower member 19. The last named voltage is applied to a first branch 21 of the second control voltage generator 22 of the electronic regulator 12, 22 (or 13 in FIG. 8). The output voltage $U_A$ delivered by the first branch 21 is further controlled by a temperature correcting member 23 connected to the first branch 21. The manner in which the temperature correction is effected will be discussed hereinafter in connection with FIGS. 2, 3 and 5.

The output voltage $U_A$ is compared in a desired and actual value comparator 21a (described in more detail in connection with FIG. 5) with an output signal $U_R$ (also discussed in more detail hereinafter). The signal resulting from the aforenoted comparison is amplified in a power amplifier 24 and in a subsequent end stage 25 thus generating an output signal $S_{II}$ of the second control voltage generator 22. The control signal $S_{II}$ displaces a fuel rack 27 of a fuel injection apparatus 28 by energizing a setting magnet 26a against a return spring 26b. The components 26a and 26b constitute a control member 26. The fuel injection apparatus 28 may be a known series-type fuel injection pump incorporating the fuel rack 27.

The momentary position of the fuel rack 27 is reported back by means of a fourth mechanicoelectrical converter 29 to the input of the second control voltage generator 22. For this purpose, the fourth mechanicoelectrical converter 29 generates a voltage $U_{WR}$ which represents an actual value and which is transformed in a second branch 30 of the second control voltage generator 22 into an output voltage $U_R$ which, as mentioned earlier, is compared with the output voltage $U_A$ in the comparator member 21a.

The output voltages $U_A$ and $U_R$ of the two branches 21 and 30 effect an increased or a reduced control signal $S_{II}$ until the fuel rack 27, moved by the setting magnet 26a, reaches a position predetermined by the three-dimensional cam 15, at which time then the fuel injection pump 28 delivers the desired fuel quantities. The fuel injection pump 28 delivers the metered fuel to the internal combustion engine 10. By means of an air pressure correcting member 31 the output voltage $U_R$ of the second branch 30 may be varied, in addition to the temperature correction in the first branch 21, as a function of the environmental pressure of the air surrounding the internal combustion engine.

It is seen that the temperature correcting member 23 and the air pressure correcting member 31 are connected to separate branches of the second control voltage generator 22. This arrangement has the advantage that the correcting signals have no mutual effect on one another and the setting of values most favorable for the engine may be effected in a simple manner with inexpensive resistance circuits.

Turning now to the diagrams shown in FIGS. 2 and 3, there are illustrated the desired effects of the temperature correction on the control of the regulating path RW of the fuel rack 27 dependent upon the stroke $H_{RN}$ of the three-dimensional cam 15. In the diagram of FIG. 2 the ordinate is the regulating path RW, while the abscissa is the stroke $H_{RN}$ of the three-dimensional cam. There are shown temperatures T1 to T9 as parameters; the increment between each successive temperature step, for example, between T1 and T2 or T5 and T6 is equal and of positive value. The two vertical lines indicate the stroke of the three-dimensional cam at idling (L) and at full load (V), respectively. In FIG. 3 the regulating path RW is shown as a function of the temperature T, and as parameter there is shown a constant stroke of the three-dimensional cam. It may be observed from the two graphs that the regulating path RW has substantially a hyperbolic course with respect to the temperature T. The manner in which such a course is effected will be explained hereinafter in connection with FIG. 5.

Turning now to FIG. 4, the first mechanico-electrical converter 11 is formed of an inductive r.p.m. sensor 32 for generating r.p.m.-dependent pulses, and an electronic pulse converter 33 having an integrating member 34 for the conversion of the pulses into an r.p.m.-dependent DC voltage $U_n$ (desired value). The latter is transformed into an output signal $S_I$ in the first control voltage generator 12 by a desired and actual value comparator 35, a power amplifier 36 and an end stage 37. The signal $S_I$ drives a rotary magnet 14 as long as there exists in the comparator 35 a voltage differential between the desired value represented by the output voltage $U_n$ of the converter 11 and the actual value represented by the output voltage $U_D$ of the second mechanicoelectrical or feedback converter 16. In this manner the output signal $S_I$ maintains a value which corresponds to a predetermined angular position of the rotary magnet 14. The setting force of the magnet 14, which is proportionate to the output signal $S_I$ is, in the position of rest of the rotary magnet 14, identical to the return force of a reset spring 104 to be described in more detail in connection with FIG. 7. The second mechanicoelectrical converter 16 basically comprises an inductive motion sensor 38 and an associated demodulator 39 and generates, as an actual value for the desired and actual value comparator 35, the DC voltage $U_D$.

Turning now to FIG. 5, there is shown that part of the regulating circuit described in connection with FIG. 1 which converts the displacements sensed at the three-dimensional cam 15 into corresponding regulating paths RW of the fuel rack 27. The part of the regulating circuit depicted in FIG. 5 comprises substantially the first branch 21, the second branch 30, the power amplifier 24 and the end stage 25, all forming part of the second control voltage generator 22, and further, the third and the fourth mechanicoelectrical converter 20 and 29, respectively, the temperature correcting member 23, the air pressure correcting member 31 and the control member 26.

To a unilaterally grounded coil 41 which forms part of the third mechanicoelectrical converter 20 and which consists of two windings, there are applied signals from an oscillator 40. The core 42 of the coil 41 is displaced by a follower member 19 (FIG. 1) as a function of the position of the three-dimensional cam 15 and thus the inductance, or more precisely, the ratio of inductance of the two windings of the coil 41 is changed. In this manner at the tap of the coil 41 there appears an AC voltage $U_{WA}$ which is affected by the position of the three-dimensional cam 15 and determined by the position of the follower member 19. To the tap of the coil 41 there is connected a diode 43, the cathode of which is connected with a condenser 44, a resistance 45 and the base of an emitter follower n-p-n transistor 46. The collector of the transistor 46 is connected to the positive terminal of a stabilized voltage source (not shown) which, in turn, is energized by the battery of the vehicle. Hereinafter, the aforenamed positive terminal will shortly be referred to as "+."

By means of the demodulator circuit formed of the diode 43, the condenser 44 and the resistance 45, there is obtained at the emitter of the transistor 46 an output voltage $U_A$ which is dependent upon the position of the core 42 and which may be tuned by means of a tuning circuit 47 formed of resistances.

The output voltage $U_A$ of the first branch 21 is, in addition, variable by the temperature correcting member 23 which is connected to the setting circuit 47 through an emitter-follower p-n-p transistor 48. The temperature correcting member 23 basically comprises a voltage divider formed of a fixed resistance 49 and a unilaterally grounded temperature-dependent NTC-resistance 50. The reason for using the transistor 48 is to prevent an overloading of the circuitry in the first branch 21 by the NTC-resistance 50 due to the substantial variations in its resistance. The tap of the voltage divider 49, 50 is connected to the base of the transistor 48. Between this tap and the fixed resistance 49 there is inserted an additional diode 51 for the compensation of the environmental temperature. By grounding the NTC-resistance 50, a very satisfactory heat transfer from the cylinder head of the engine to the resistance 50 is effected since its so-called "semi-conductor pill" may be attached directly to the cylinder head without insulation.

For a correction of the warming run of the engine there is required a multiplied change of the position of the control member 26, or more precisely, of the position RW of the fuel rack 27 determined by the three-dimensional cam 15. For identical temperature steps from higher to lower temperatures this change should be greater (see FIG. 2) and for a constant stroke $H_{RN}$ of the three-dimensional cam 15 it should have an approximately hyperbolic course (see FIG. 3). This course may be achieved by means of the aforedescribed circuit of the temperature correcting member 23 and the known course of the characteristic curve pertaining to the NTC-resistance 50.

The output voltage $U_A$ (desired value) encounters in the desired and actual value comparator member 21a the output voltage $U_R$ (actual value) of the second branch 30 of the second control voltage generator 22. The second branch 30 is built as follows.

A second oscillator 53 applies signals to a coil 54 of the fourth mechanicoelectrical converter 29 which, similarly to the third converted 20, is functioning as an inductive voltage divider. It is feasible that the first oscillator 40 also fulfills the function of the second oscillator 53 provided that it is regulated to a constant amplitude. A movable core 55 is coupled with the mechanical output of the control member 26 by means of a mechanical connection indicated by the broken line 56. To the tap of the coil 54 which at one end is connected to +, there are connected through a condenser 57 a resistance 58 and the base of p-n-p- transistor 59. The collector of the latter is grounded through a resistance 60, while its emitter is connected to + through a condenser 61. The emitter-follower transistor 59 with its associated components 57, 58, 60, 61 is connected as a separating stage between the fourth mechanicoelectrical converter 29 and the air pressure correcting member 31 which, in turn, is formed of an aneroid box 62 and a fifth mechanicoelectrical converter 63. The latter, similarly to the fourth mechanicoelectrical converter 29, is formed of a voltage divider comprising a coil 64 and a core 65. The converter 63 does not need a separate oscillator because it is supplied with the AC voltage $U_{WR}$ of the converter 29. The coil 64, similarly to the coil 54, is connected to + and the core 65 is mechanically connected with the aneroid box 62. The different displacements of the aneroid box 62 caused by the different air pressures are converted into voltage variations by means of the displacement of the core 65 with respect to the coil 64. Accordingly, the aforenoted voltage variations change the DC voltage $U_R$ which appears at the output of the second branch 30 and which is derived from the AC voltage $U_{WR}$. The fifth mechanicoelectrical converter 63 is connected as a Wheatstone bridge with a first part of a setting circuit. The said first part comprises resistances 66, 67 and 68. The line resistance 66 determines the magnitude of the voltage variation of the converter 63. The second part of the setting circuit is formed of five resistances 69, 70, 70a, 71 and 72. Between the two parts of the setting circuit three is inserted a demodulator circuit formed of a diode 73, a condenser 74 and a resistance 75. An emitter-follower p-n-p transistor 76 which has its base connected to the anode of the diode 73, the condenser 74 and the resistance 75, its collector grounded and its emitter connected with the resistance 69 of the second part of the setting circuit, serves as an impedance converter. The DC voltage $U_R$ tapped between the two resistances 71, 72 is compared in the desired and actual value comparator member 21a at the adding junction 52 through an adder resistance 77 with the DC voltage signal $U_A$ matched by an adder resistance 78. Since both DC voltage signals $U_R$ and $U_A$ have a different sign with respect to the fixed potential at the positive input 84 of the power amplifier 24, an increased signal $U_A$, for example, may be compensated with a corresponding increase in signal $U_R$. The voltage taken from the adding junction 52 controls, as a regulating deviation, the negative control input 79 of the power amplifier 24, the output of which is connected with the end stage 25. At the output of the end stage 25 there appears, dependent upon magnitude and sign of the differential voltage at the junction 52, a control signal $S_{II}$ of greater or lesser strength. The current of signal $S_{II}$ affects the force of the setting magnet 26a in such a manner that the setting magnet 26a is rotated in the one or the other direction by the force of the spring 26b or by the opposing electromagnetic force, whichever is greater. If the signal corresponding to the desired value is fed back through the connection 56 to the input of the second branch 30, the magnet and spring forces are maintained in equilibrium. The condensers 80, 81 and the resistances 82, 83 serve for stabilizing the regulating circuit. To the positive control input 84 of the power amplifier 24 there is connected the tap of a voltage divider comprising resistances 85 and 86 to form a comparison voltage for the differential voltage at the junction 52.

If necessary, further corrections may be effected by means of additional correcting members 87, 88 and 89 shown in broken lines and inserted between the coil 41 and ground, or between the solenoid 54 and +, or between the coil 64 and +.

Figure 6:
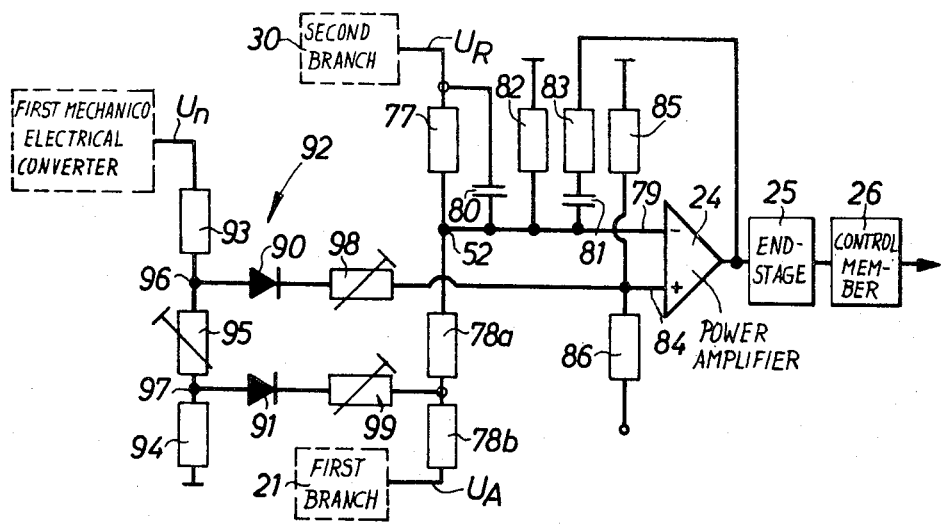
FIG. 6 is a circuit diagram of an idling run correcting member inserted in the first and second parts of the regulating apparatus.

Since different engines even of the same manufacturing series never have entirely identical fuel requirements in the lower idling r.p.m. range, it is necessary to adjust the normally cam-controlled fuel quantities in the lower idling r.p.m. range. As illustrated in FIG. 6, such a result is advantageously achieved by means of a diode gate 92 formed basically of two diodes 90, 91 and insertable—as shown in FIG. 6—into the circuit shown in FIG. 5. To the diode gate 92 there is applied the r.p.m.-dependent voltage $U_n$ of the first mechanicoelectrical converter 11 (FIGS. 1 and 4). More accurately, the voltage $U_n$ is applied to a unilaterally grounded voltage divider which is formed of three resistances 93, 94, 95 and which has two taps 96 and 97 connected, respectively, with the anodes of the diodes 90 and 91. The resistance 95 between the two taps 96 and 97 is variable, so that the voltages appearing at the two taps 96 and 97 may be set in such a manner that in the desired idling r.p.m. range where a deviation of the delivered fuel quantities from the values controlled by the three-dimensional cam 15 is desired, only one of the diodes 90 or 91 is conductive at any given time. The cathode of the diode 90 is connected through a variable resistance 98 to the positive input 84 of the power amplifier 24 and the cathode of the diode 91 is connected through a variable resistance 99 and amplifier 24. Between the variable resistance 99 and the the junction 52 to the negative input 79 of the power adding junction 52 there is inserted an adjusting resistance part 78a which, together with a further resistance part 78b, takes the place of the resistance 78 of FIG. 5. The components 21, 24, 25, 26, 30, 52 and 77–86 in FIG. 6 correspond to those in FIG. 5.

If a smaller fuel quantity for the idling run is desired, then the variable resistance 95 is set in such a manner that in the idling r.p.m. range the diode 90 is conductive. For a desired larger fuel quantity for idling run, the diode 91 has to be rendered conductive. This circuit operates in the desired manner if the r.p.m.-dependent voltage $U_n$ delivered by the converter 11 decreases in case of an increasing r.p.m., for example, from 9 volts at idling r.p.m. to almost zero volts at the maximum possible r.p.m. In this case, because of the lowered voltage, the diodes 90, 91 block the current flow for an r.p.m. that lies above the idling r.p.m. At higher r.p.m.'s, therefore, this correction is no longer effective.

It is thus seen that by means of the variable resistance 95 it is determined at what r.p.m. and in what direction (increase or decrease) should the correction relating to the fuel quantities for idling run occur. By means of the variable resistances 98 and 99 the magnitude of the desired correction may be determined.

Figure 7:
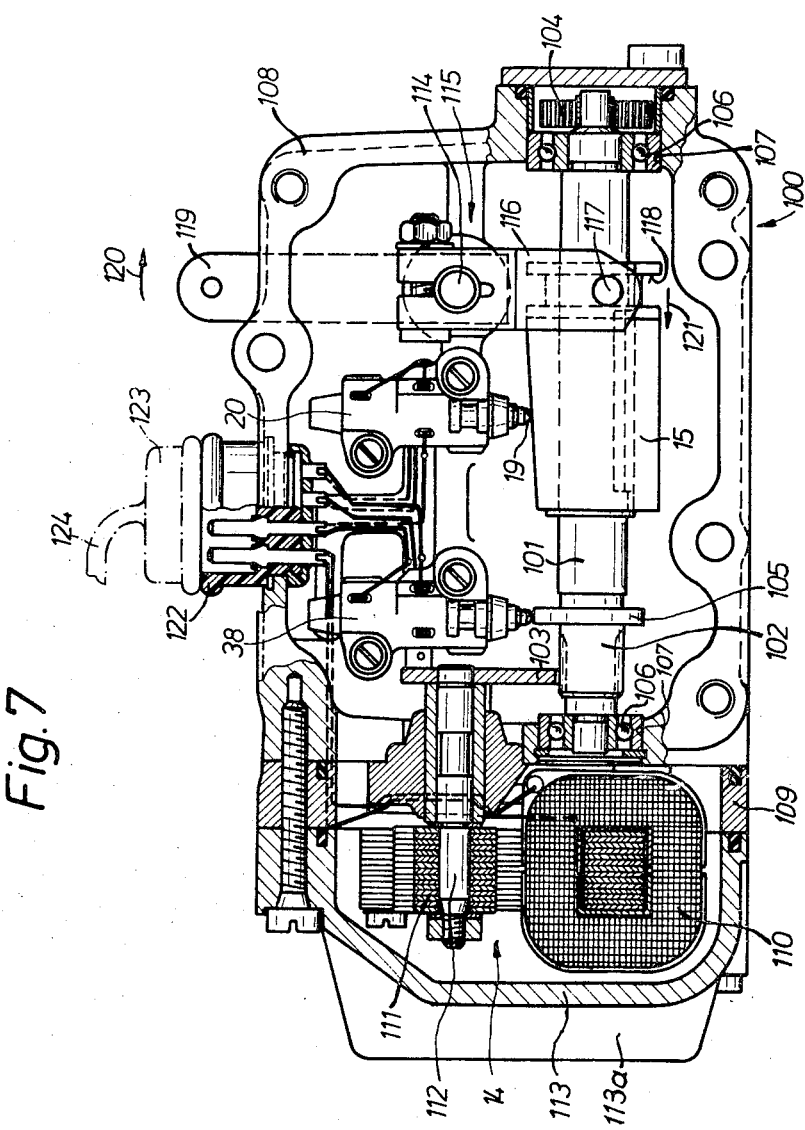
FIG. 7 is a schematic longitudinal sectional view of a practical embodiment of that part of the regulating apparatus that controls the three-dimensional cam.

Turning now to FIG. 7, the three-dimensional cam 15 and its follower pin 19 are disposed, together with the rotary magnet 14, the inductive position indicator 38 of the second mechanicoelectrical converter 16 (FIG. 4) and the third mechanicoelectrical converter 20 in a cam control apparatus 100. The three-dimensional cam 15 is axially slidably held on a shaft 101. One end of the latter carries a pinion 102 which meshes with a tooth gear segment 103 of the rotary magnet 14. To the other end of the shaft 101 there is secured a spiral return spring 104 which exerts a torque on the shaft 101 and thus on the three-dimensional cam 15 against the torque exerted by the setting force of the rotary magnet 14. Adjacent the pinion 102 there is provided a spiral cam 105 the stroke of which is sensed by the inductive position indicator 38. The output signal $U_D$ of the component 38 as already described in connection with FIG. 2, serves as a feedback signal characterizing the angular position of the three-dimensional cam 15. In order to reduce friction as much as possible, the shaft 101 is supported by two ball bearings 106 which are inserted into aligned bores 107 of a housing 108. A housing flange 109 carries a solenoid 110 and an armature 111 of the rotary magnet 14 and includes a support bore for an armature shaft 112 which connects the armature 111 with the toothed gear segment 103. The rotary magnet 14 is covered by a closure 113 provided with cooling ribs 113a.

In the housing 108 there is also supported, spaced from and normal to the shaft 101, a further shaft 114 that forms part of a setting mechanism 115 for the transmission of the motion of the operator lever 18 (see FIG. 1) to the shaft 101. To the shaft 114 there is affixed a rocker arm 116 carrying an actuator pin 117 which extends into an annular circumferential groove 118 of the three-dimensional cam 15. To the shaft 114 there is keyed a setting lever 119 disposed externally of the housing 108 and connected to the operator lever 18 (FIG. 1).

If, for example, the setting lever 119 is moved in the direction of the arrow 120, then the shaft 114 is rotated clockwise and the rocker arm 116 displaces axially the three-dimensional cam 15 in the direction of arrow 121 by means of the actuator pin 117.

The electric conductors associated with the solenoid 110 of the rotary magnet 14 and with the two inductive position indicators 38 and 20 are accessible from the outside through an 8-pole terminal box 122 inserted in the housing 108. To the terminal box 122 there may be connected a commercially available plug 123 indicated with dash-dotted lines which, by means of a cable 124, connects the three-dimensional cam control apparatus 100 with the electronic regulator 13 illustrated in FIG. 8.

Figure 8:
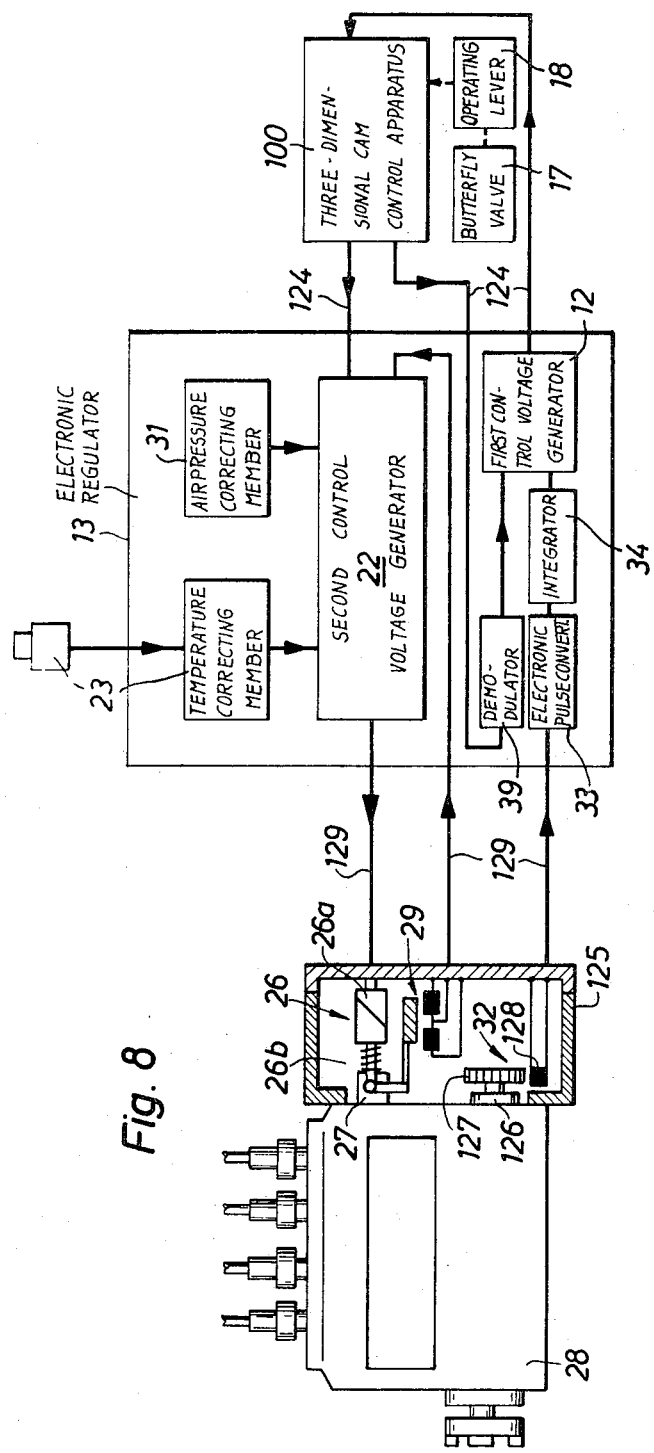
FIG. 8 is a schematic illustration of an advantageous spatial arrangement of the individual structural groups of the regulating apparatus according to the invention.

Turning now to FIG. 8, there is illustrated the entire regulating apparatus in a simplified manner showing a practical and advantageous arrangement of the individual structural groups. In a housing 125 attached to the housing of the fuel injection pump 28, there are arranged the setting magnet 26a connected with the fuel rack 27, the spring 26b, the fourth mechanicoelectrical converter 29 as well as the inductive r.p.m. sensor 32. The latter is driven by the camshaft 126 of the fuel injection pump 28 and formed of a gear 127 and a coil 128. The electronic regulator 13 containing all the electronic components as well as the temperature correcting member 23 and the air pressure correcting member 31, is arranged remote from the fuel injection pump 28 and is preferably secured to the vehicle body where it is exposed to lesser acceleration forces than if it were attached to the engine. It is also preferred to attach to the vehicle body, in the vicinity of the butterfly valve 17, the three-dimensional cam control apparatus 100 which is connected mechanically with the operating lever 18 and which is connected electrically by means of the cable 124 with the electronic regulator 13. The conductors between the fuel injection pump 28 and the electronic regulator 13 are combined into a cable 129 not illustrated in detail.

What is claimed is:

1. In an apparatus for regulating the air-fuel mixture in an internal combustion engine, said apparatus being of the known type that includes (a) a fuel injection pump delivering metered fuel to said internal combustion engine, (b) a fuel rack incorporated in said fuel injection pump and metering said fuel as a function of its position, (c) a control member connected to said fuel rack for determining the position of the latter as a function of a plurality of operational parameters, (d) a three-dimensional cam, (e) a follower member in contact with said three-dimensional cam, (f) r.p.m. sensor means for affecting the position of said three-dimensional cam as a function of the engine r.p.m., (g) means for determining the relative position between said follower member and said three-dimensional cam as a function of an arbitrarily movable operator lever connected to the air flow controlling butterfly valve of the internal combustion engine, (h) means for affecting the position of said control member as a function of the position of said follower member, (i) at least one correcting member for affecting the position of said fuel rack as a function of a physical magnitude, the improvement comprising, (A) a first mechanicoelectrical converter forming part of said r.p.m. sensor means for delivering an r.p.m.-dependent voltage, (B) a first control voltage generator electrically connected to said first mechanicoelectrical converter for receiving said r.p.m.-dependent voltage, said first control voltage generator delivering a first electric power signal, (C) an electric setting member electrically connected to said first control voltage generator for receiving said first electric power signal, said electric setting member being connected to said three-dimensional cam for affecting the position of the latter in response to said first electric power signal, (D) a third mechanicoelectrical converter connected to said follower member for receiving a mechanical signal as a function of the position of said follower member, said third mechanicoelectrical converter delivering an electric signal constituting a desired value pertaining to the quantity of fuel to be delivered by said fuel injection pump, (E) a fourth mechanicoelectrical converter connected at least indirectly to said fuel rack for receiving mechanical signals as a function of the position of said fuel rack, said fourth mechanicoelectrical converter delivering an electric signal constituting an actual value pertaining to the quantity of fuel delivered by said fuel injection pump and (F) a second control voltage generator electrically connected to said control member and having (1) a first branch electrically connected to said third mechanicoelectrical converter for receiving said electric signal constituting said desired value, said first branch delivering a first signal to be compared, (2) a second branch electrically connected to said fourth mechanicoelectrical converter for receiving said electric signal constituting said actual value, said second branch delivering a second signal to be compared, (3) means delivering a second electric power signal to said control member for affecting the position thereof, said second electric power signal being derived from a comparison between said first and second signals to be compared.

2. An improvement as defined in claim 1, including at least one electric correcting member electrically connected to said second control voltage generator for additionally affecting said second electric power signal as a function of a physical magnitude.

3. An improvement as defined in claim 2, wherein said three-dimensional cam, said first control voltage generator, said second control voltage generator and said at least one electric correcting member are located remote from said fuel injection pump; said improvement further including means for mechanically connecting with said fuel injection pump said control member and an r.p.m. sensor forming part of said first mechanicoelectrical converter, said control member and said r.p.m. sensor being the sole components of said apparatus that are mechanically connected to said fuel injection pump.

4. An improvement as defined in claim 1, including a second mechanicoelectrical converter mechanically connected at least indirectly to said three-dimensional cam and electrically connected to said first control voltage generator, said second mechanicoelectrical converter delivering an electric signal to said first control voltage generator for affecting said first electric power signal as a function of the position of said three-dimensional cam.

5. An improvement as defined in claim 4, including a motion sensor forming part of said second mechanicoelectrical converter and a setting mechanism forming part of said means for determining the relative position between said follower member and said three-dimensional cam; said electric setting member, said three-dimensional cam, said third mechanicoelectrical converter, said follower member, said motion sensor and said setting mechanism forming a single structural group disposed remote from said fuel injection pump.

6. An improvement as defined in claim 1, including at least one oscillator; said third and said fourth mechanicoelectrical converters being formed as inductive voltage dividers and being supplied by said oscillator.

7. An improvement as defined in claim 2, including (A) an air pressure sensing electric correcting member connected to one of said branches of said second control voltage generator for delivering an air pressure-dependent signal to affect one of said signals to be compared and (B) a temperature sensing electric correcting member connected to the other of said branches of said second control voltage generator for delivering a temperature-dependent signal to affect the other of said signals to be compared; said air pressure sensing electric correcting member and said temperature sensing electric correcting member being separated to be without effect on one another.

8. An improvement as defined in claim 7, said air pressure sensing electric correcting member including (A) an aneroid box and (B) a fifth mechanicoelectrical converter operatively connected to said aneroid box.

9. An improvement as defined in claim 8, said fifth mechanicoelectrical converter being formed of an inductive voltage divider supplied from one of the mechanicoelectrical converters of the group formed on said third and fourth mechanicoelectrical converters.

10. An improvement as defined in claim 2, including a temperature sensing electric correcting member constituted by a voltage divider including a fixed resistance and a grounded temperature-dependent resistance, said last-named voltage divider being connected to one of the two branches of said second control voltage generator to affect one of said two signals to be compared.

11. An improvement as defined in claim 10, wherein said temperature-dependent resistance is connected to said last-named branch through an emitter follower transistor.

12. An improvement as defined in claim 10, wherein said third and fourth mechanicoelectrical converters are each formed of an inductive voltage divider having a coil of variable inductance, said improvement further includes a demodulator circuit connected to one of said coils of variable inductance and to said temperature-dependent resistance.

13. An improvement as defined in claim 1, including a diode gate having two diodes with associated variable resistances, said first mechanicoelectrical converter being connected to said second control voltage generator through said diode gate for affecting said second electric power signal.

References Cited

UNITED STATES PATENTS

| 2,950,706 | 8/1960 | Senckel | 123—32 |
| 3,039,988 | 6/1962 | Trinkler | 123—32 |
| 2,981,244 | 4/1961 | Hendrickson | 123—32 |

FOREIGN PATENTS

| 1,131,463 | 3/1955 | France | 123—32 |

LAURENCE M. GOODRIDGE, Primary Examiner

R. B. COX, Assistant Examiner

U.S. Cl. X.R.

123—32 AE, 32 EA, 139 E, 119 R